Jan. 31, 1961 O. N. HILLIS 2,969,850
FOLDING STEPS
Filed June 5, 1959 2 Sheets-Sheet 1
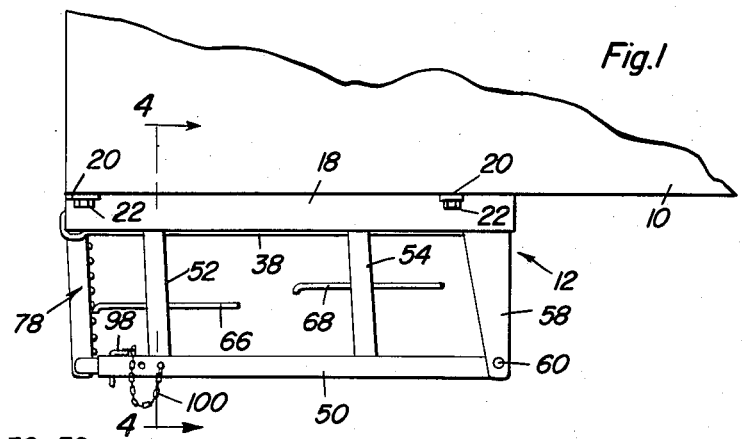
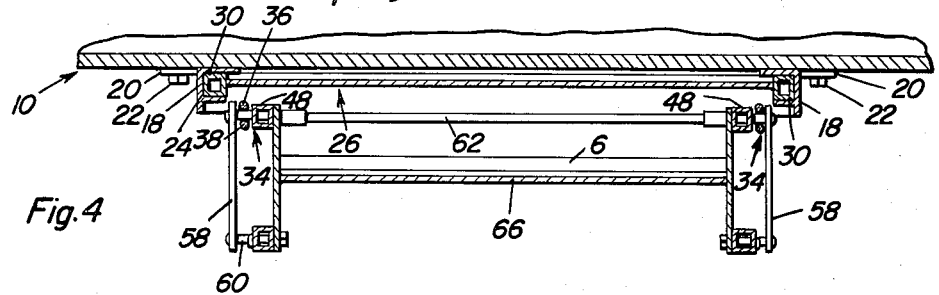
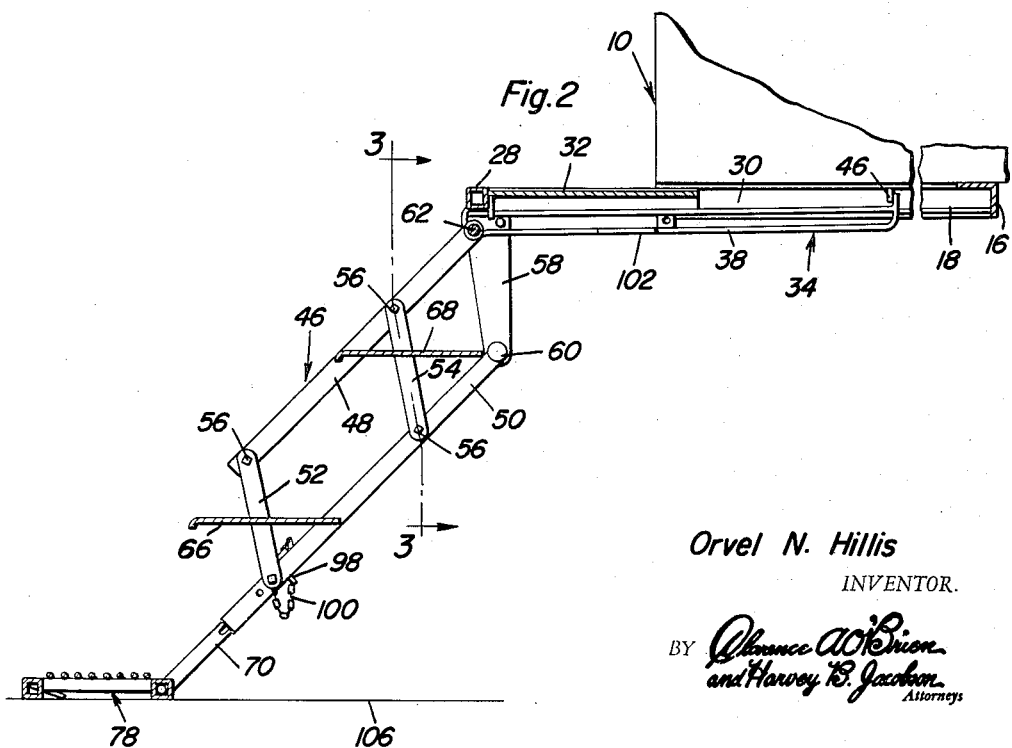
Orvel N. Hillis
INVENTOR.

Jan. 31, 1961     O. N. HILLIS     2,969,850
FOLDING STEPS
Filed June 5, 1959     2 Sheets-Sheet 2
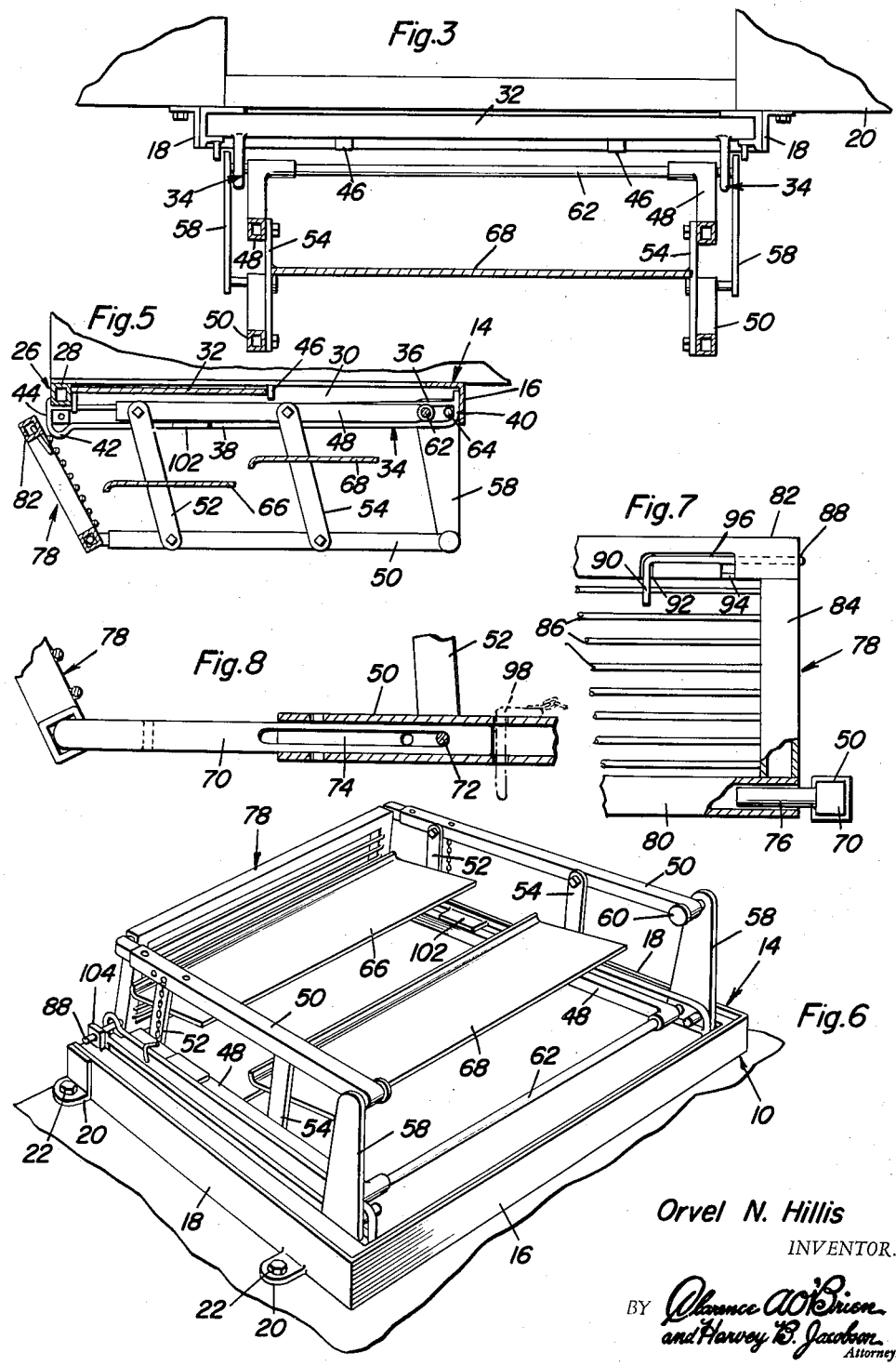
Orvel N. Hillis
INVENTOR.

United States Patent Office
2,969,850
Patented Jan. 31, 1961

2,969,850
FOLDING STEPS
Orvel N. Hillis, 410 E. Louisiana, Sweetwater, Tex.
Filed June 5, 1959, Ser. No. 818,315
7 Claims. (Cl. 182—88)

This invention relates in general to new and useful improvements in step construction, and more specifically to a novel folding step construction.

In many instances it is desirable to have sturdy steps which are so mounted that they may be readily folded into a compact unit for storage. A typical example of this is a trailer which, when stationary, must have steps which are extremely sturdy because of the general use of the steps. On the other hand, when the trailer is being moved from site to site, it is absolutely necessary that the steps either be removed or folded into a very small space. Of course, if the steps are of a heavy construction, which they should be to be sturdy, then it is difficult to remove the steps. For these reasons it is desirable that the steps of a vehicle, such as a trailer, be foldable into a relatively small space beneath the trailer.

It is therefore the primary object of this invention to provide a standard step arrangement, which step arrangement is so constructed that it may be readily folded to occupy a very small space, the individual steps of the step construction being pivotable and swingable so that a minimum of height is required for the folding steps in their folded state.

Another object of the invention is to provide a folding step construction which may be utilized in conjunction with trailers and the like, the folding step construction including not only steps providing necessary height scaling means, but also an upper landing which may be utilized in the case of a trailer by a person standing at the door of the trailer either for unlocking the door or for conversation purposes.

Still another object of the invention is to provide an improved folding step construction, the folding step construction including a base member which will support the frame of the step construction with respect to the ground, the base member being in the form of foot wiper to facilitate the cleaning of one's shoes before ascending the steps.

A further object of the invention is to provide a novel step construction which includes a supporting frame which may be secured to the underside of a trailer, a track which may be slid relative to the supporting frame from beneath a trailer to a partially extended position, the track carrying an upper landing for the steps, and a pivotally mounted pair of stair rails swingably and slidably connected to the track to facilitate the extension and retraction of the step members as well as their swinging from an inclined position to a generally horizontally disposed stored position.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

Figure 1 is a fragmentary elevational view of an elevated device, such as a trailer, which has secured to the underside thereof the folding steps which are the subject of this invention, the folding steps being shown in their folded state;

Figure 2 is an elevational view similar to Figure 1 and shows the folding steps in their fully extended operative position;

Figure 3 is a fragmentary transverse vertical sectional view taken substantially upon the plane indicated by the section line 3—3 of Figure 2 and shows generally the arrangement of the steps;

Figure 4 is a fragmentary transverse vertical sectional view taken substantially upon the plane indicated by the section line 4—4 of Figure 1 and shows the arrangement of the components of the steps when in their stored position;

Figure 5 is a longitudinal vertical sectional view taken through the steps in their folded state, the base member of the steps being shown in its partially released position, the view showing the arrangement of the support and the track;

Figure 6 is a bottom perspective view of the step construction in its folded state and shows generally the details of the various components thereof;

Figure 7 is a fragmentary elevational view of the base of the steps when in its upright folded position and shows the manner in which it is pivotally connected to one of the frame rails of the steps and the details of a latch for holding the steps in an elevated folded position; and Figure 8 is a fragmentary side elevational view of the base member and one of the frame rails of the steps, the frame rail being shown in section in order to clearly illustrate the maner in which the base member may be moved up and down with respect to the individual steps to compensate for variations in distances between the underside of the supporting structure and the ground.

Referring now to the drawings in detail, there is illustrated an elevated support member which, for the purpose of the present invention, will be considered as a trailer 10. This is a typical use requirement of the present invention although the invention is not limited to use with a trailer. The folding steps, which are the subject of this invention, are secured to the underside of the trailer 10, the folding steps being referred to in general by the reference numeral 12.

The folding steps 12 include a support which is generally referred to by the reference numeral 14. The support 14 is generally U-shaped in outline, as is best shown in Figure 6, and includes a rear frame member 16 and a pair of side frame members 18. The side frame members 18 are provided with ears 20 which project outwardly therefrom and which receive anchor bolts 22 which are utilized to secure the support 14 to the underside of the trailer 10.

Referring now to Figure 4 in particular, it will be seen that each of the side frame members 18 is of an F-shape cross-section so as to provide a guide channel 24. A track assembly, generally referred to by the numeral 26 is slidably mounted within the guide 24 for moving between a fully telescoped position within the support 14 and a partially extended position, as is illustrated in Figure 2.

The track assembly 26 includes a generally U-shaped frame including a front transverse frame member 28 and a pair of rearwardly extending frame members 30 which function as runners, the frame members 30 being telescoped in the guides 24. A flat plate extends between the forward parts of the runners 30 and is secured to the rear surface of the transverse frame member 28. The flat plate reinforces the frame of the track assembly 26 and functions as a landing 32, which will be described in more detail hereinafter.

The track assembly 26 also includes a pair of longitudinally extending rails 34, the outline of which is best illustrated in Figure 5. Each of the rails 34 includes an upper portion 36 and a lower portion 38. The lower portion 38 terminates at its rear end in an upstanding leg 40 to which the rear end of the upper portion 36 is connected. The leg 40 has an offset portion which is connected to the associated runner 30. The forward part of the lower portion is curved downwardly and then upwardly to provide a seat 42 and terminates in an upstanding leg 44 which is secured to the forward part of the transverse frame member 28. The forward end of the upper portion 36 directly underlies the transverse frame member 28 and is secured to the upstanding leg 44.

A stop member 46 extends inwardly from the least one of the runners 30. The stop member 46 is so positioned that when the track assembly 26 is retracted, the rear edge of the landing 32 will strike thereagainst and limit the telescoping of the track assembly 26 within the support 14. When the track assembly 26 is pulled out of the support 14, the upper end of the associated leg 40 will strike the stop member 46 and limit the outward movement of the track assembly 26 with respect to the support 14.

The invention also includes a step unit general referred to by the numeral 46. The step unit 46 includes a pair of side rail assemblies each of which includes an upper side rail 48 and a lower side rail 50. The side rails 48 and 50 are hingedly connected together through the use of a pair of links 52 and 54 which are pivotally connected to the side rails 48 and 50 by pivot pins 56. The links 52 and 54 retain the side rails 48 and 50 in parallel relation at all times. The step unit also includes a pair of hangers 58. The hangers 58 are disposed at the rear corners of the step unit 46 and the lower side rails 50 are pivotally connected thereto as at 60. A transverse rod 62 extends through the upper ends of the upper side rails 48 and pivotally connects the upper ends of the upper side rail 48 to the hangers 58.

It is to be noted that the rails 34 are disposed intermediate the hangers 58 and the respective ones of the side rails 48. The rod 62 is positioned between the rail portions 36 and 38 and thus serves to support the hangers 58 from the rails 34. Further, as is best illustrated in Figure 5, each of the hangers 58 has a pin 64 which is disposed rearwardly of the rod 62 and which is also disposed within the confines of the rails 34. In this manner the hangers 58 are mounted for sliding movement along the rails 34 and at the same time retain their vertical depending positions.

Individual step elements 66 are rigidly secured to the links 52 and 54. Since the axis of the pivots for the upper ends of the side rails 48 and 50 are offset from each other the same distance as the axis of the pivots 56 with the individual links 52 and 54 are offset from each other, a parallelogram linkage is provided and the links 52 and 54 retain their same angle of inclination parallel to a line extending through rod 62 and pivot point 60 in all positions thereof. As a result, the individual steps 66 and 68 stay horizontal at all times.

At least the lower portions of the bottom side rails 50 are of a tubular construction and carry an extension 70. Each of the extensions 70 is telescoped within its respective side rail 50 and is free to move in and out thereof. The extension 70 is retained in its associated side rail 50 by means of a transverse pin 72 which is disposed in an elongated slot 74 in the extension 70. As is best shown in Figure 7, the lower end of each of the extensions 70 is provided with a transversely extending pivot pin 76. The pivot pin 76 is utilized in the mounting of a base member generally referred to by the numeral 78.

The base member 78 includes a general rectangular frame formed of a rear frame member 80, a front frame member 82 and a pair of side frame members 84. The side frame members 84 have secured to the upper surface thereof a plurality of rods 86 which fill the space of the frame and function as scraper bars to scrape one's feet.

The pivot pins 76 are received in the opposite ends of the rear frame member 80, which is tubular, so as to pivotally mount the base member 78.

The base member 78 is also provided with a pair of latches 88. Each of the latches 88 is disposed in an end portion of the front frame member 82, which is of a tubular construction. The individual latches 88 are provided with a handle 90 which is selectively seated in one of a pair of notches 92 and 94 for retaining the latch 88 in either a projected position or a retracted position. The notches 92 and 94 are connected together by an elongated slot 96 which permits the movement of the handle 90 and the retraction or extension of the latch member 88.

A latch member 98 is connected to at least one of the side rails 50 by means of a flexible member 100. The latch member 98, as is best shown in Figure 1, passes down through its respective side rail 50 and through the extension 70 thereof so as to lock the extension 70 in retracted position and thus retain the base member 78 immediately adjacent the free end of the side rail 50.

When the folding steps 12 are in their stored position, the track assembly 26 is telescoped within the support 14. Further, the hangers 58 are slid rearwardly to the rear portions of the rails 34. The forward parts of the side rails 48 rest upon supporting shelves 102 of the rails 34. In this manner the step unit 46 is supported in a generally horizontal position within the confines of the support 14. The base member 78 is utilized to lock the step unit to the support 14. The latch members 88 are projected from the front frame member 82, which is now disposed uppermost and generally aligned with the seats 42. The latch members 88 pass through the folded parts of the rails 34 and are disposed in the seats 42. The outer parts of the latch members 88 pass through depending ears 104 which are secured to the forward parts of the side frame members 18 of the support 14, as is best shown in Figure 6.

When it is desired to utilize the folding steps 12, the latch members 88 are moved to their retracted positions and the latch members 98 are removed. The step unit 46 is then pulled forwardly until the side rails 48 have cleared the shelves 102, at which time it is swung downwardly to the position illustrated in Figure 2. Further outward movement of the step unit 46 will result in the outward sliding of the track assembly 26 so as to position the landing 32 outwardly of the trailer 10. The telescopic connection between the base member 78 and the lower side rails 50 permit the base member 78 to rest upon the ground, for example the ground 106, and at the same time be connected to the step unit 46 notwithstanding variations in the height of the trailer 10 with respect to the ground 106. While this may make a slight variation in the distances between the base member 78 and the first step 66, the variation will be relatively slight, depending upon the ground contour.

From the foregoing, it will be readily apparent that there has been devised a highly desirable folding step construction which may be utilized in conjunction with trailers and the like, the folding step construction being of an extremely rigid nature and at the same time readily foldable so as to be stored beneath a trailer occupying a minimum space. In addition, there is provided a novel landing which may be retracted and extended, as is necessary. Further, there is provided a novel base member which is so mounted as to compensate for variations in ground contour.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A folding step assembly comprising a support, a step unit, said step unit including hangers and side rails, means slidably connecting said hangers to said support, and means retaining said hangers in a fixed depending angular position with respect to said support, a pair of said side rails pivoted to one of said hangers at spaced points thereon, a first link spaced from said one hanger pivoted to each of said pair of side rails, said one hanger, said first link and said side rail portions therebetween defining a parallelogram, and steps fixedly secured to said link.

2. The combination of claim 1 wherein said means connecting said hangers to said support is in the form of a track unit, said track unit being slidably mounted in said support.

3. The combination of claim 2 wherein said track unit includes a landing movable therewith between a retracted position beneath said support and an extended position.

4. The combination of claim 1 wherein said means connecting said hangers to said support is in the form of a track unit, said track unit being slidably mounted in said support, said hangers slidably supported from said track unit.

5. The combination of claim 4 wherein said track unit includes a landing movable therewith between a retracted position beneath said support and an extended position, said track unit defining a seat proximate the forward end of said landing, and means connected to said hanger receivable in said seat for retaining said hanger in forwardly slid position.

6. A folding step assembly comprising a support, a step unit, said step unit including hangers and side rails, means slidably connecting said hangers to said support, and means retaining said hangers in a fixed depending angular position with respect to said support, a pair of said side rails pivoted to one of said hangers at spaced points thereon, a first link spaced from said one hanger pivoted to each of said pair of side rails, said one hanger, said first link and said side rail portions therebetween defining a parallelogram, and steps fixedly secured to said link, extensions extendable from said side rails, a base member freely terminally pivoted to said extensions whereby said base member may be horizontally disposed on the ground with the extensions automatically compensating from ground height variations.

7. A folding step assembly comprising a support, a step unit, said step unit including hangers and side rails, means slidably connecting said hangers to said support, and means retaining said hangers in a fixed depending angular position with respect to said support, a pair of said side rails pivoted to one of said hangers at spaced points thereon, a first link spaced from said one hanger pivoted to each of said pair of side rails, said one hanger, said first link and said side rail portions therebetween defining a parallelogram, and steps fixedly secured to said link, extensions extendable from said side rails, a base member freely terminally pivoted to said extensions whereby said base member may be horizontally disposed on the ground with the extensions automatically compensating for ground height variations, and latch means carried by said base member and engaging said support to retain said step assembly in a retracted position.

References Cited in the file of this patent

UNITED STATES PATENTS

| | | |
|---|---|---|
| 1,843,500 | Appelt | Feb. 2, 1932 |
| 2,487,660 | McCann | Nov. 8, 1949 |
| 2,611,466 | Biggert et al. | Sept. 23, 1952 |
| 2,755,102 | Gerdes | July 17, 1956 |
| 2,779,525 | Vogel | Jan. 29, 1957 |
| 2,863,594 | Shafer | Dec. 9, 1958 |